(12) United States Patent
Dickman

(10) Patent No.: US 7,729,998 B2
(45) Date of Patent: Jun. 1, 2010

(54) METHOD FOR SHIPPERS TO MANAGE FUEL COSTS

(76) Inventor: Craig S. Dickman, 2914 Westline Rd., Green Bay, WI (US) 54313

( * ) Notice: Subject to any disclaimer, the term of this patent is extended or adjusted under 35 U.S.C. 154(b) by 351 days.

(21) Appl. No.: 11/371,782

(22) Filed: Mar. 9, 2006

(65) Prior Publication Data
US 2006/0218056 A1 Sep. 28, 2006

Related U.S. Application Data

(60) Provisional application No. 60/660,517, filed on Mar. 10, 2005.

(51) Int. Cl.
G06Q 10/00 (2006.01)
G06Q 30/00 (2006.01)
G06F 19/00 (2006.01)
G06G 7/70 (2006.01)
G06G 7/76 (2006.01)

(52) U.S. Cl. .................. 705/335; 705/336; 705/334; 705/337; 705/338; 701/123

(58) Field of Classification Search .............. 705/1
See application file for complete search history.

(56) References Cited

U.S. PATENT DOCUMENTS

| | | |
|---|---|---|
| 5,966,697 A | 10/1999 | Wright |
| 5,970,474 A | 10/1999 | LeRoy et al. |
| 6,016,504 A | 1/2000 | Arnold et al. |
| 6,249,772 B1 | 6/2001 | Walker et al. |
| 6,332,128 B1 | 12/2001 | Nicholson |
| 6,587,827 B1 | 7/2003 | Hennig et al. |

(Continued)

FOREIGN PATENT DOCUMENTS

JP 11066189 A * 3/1999

OTHER PUBLICATIONS

"Mojave to Break Ground This Month; Trailblazer Gets Blanket Certificate"; Inside F.E.R.C.'s Gas Market Report; Apr. 26, 1991. Nexus.*

*Primary Examiner*—John W Hayes
*Assistant Examiner*—David J Clark
(74) *Attorney, Agent, or Firm*—Joseph T. Leone, Esq.; DeWitt Ross & Stevens S.C.

(57) ABSTRACT

A computer-implemented method for managing fuel costs, along with a corresponding apparatus, and a corresponding medium are described. The method includes receiving transaction information at a Network Administrator, the transaction information being associated with: (a) a shipper who has arranged for a shipment of goods from an origin to a destination; and (b) a corresponding carrier that has agreed to transport the shipment using a pre-determined maximum number of eligible units of fuel, where the fuel is purchased by the carrier at a pre-set base price per eligible unit, and where the fuel is purchased from pre-selected fueling locations. The maximum number of eligible units of fuel and the base price per eligible unit for the shipment are established between the shipper and the carrier, while the fueling locations are established by the Network Administrator. The actual price paid for the fuel is set by the market. Carrier fuel purchase information associated with fuel purchases made by the carrier at the pre-selected fueling locations is then transmitted to the Network Administrator.

20 Claims, 5 Drawing Sheets

U.S. PATENT DOCUMENTS

| | | |
|---|---|---|
| 6,745,190 B2 | 6/2004 | Masuda et al. |
| 6,754,636 B1 | 6/2004 | Walker et al. |
| 6,839,683 B1 | 1/2005 | Walker et al. |
| 6,868,393 B1 | 3/2005 | Densky et al. |
| 6,868,394 B1 | 3/2005 | Mele |
| 6,885,996 B2 | 4/2005 | Nicholson |
| 6,901,376 B1 | 5/2005 | Sculler et al. |
| 6,965,872 B1 | 11/2005 | Grdina |
| 6,970,837 B1 | 11/2005 | Walker et al. |
| 6,999,949 B2 | 2/2006 | Mantena et al. |
| 2001/0039512 A1* | 11/2001 | Nicholson ............... 705/14 |
| 2002/0116318 A1* | 8/2002 | Thomas et al. ........... 705/37 |
| 2005/0209913 A1* | 9/2005 | Wied et al. .............. 705/12 |
| 2006/0036448 A1* | 2/2006 | Haynie et al. ............ 705/1 |

* cited by examiner

METHOD FOR SHIPPERS TO MANAGE FUEL COSTS

CROSS-REFERENCE TO RELATED APPLICATIONS

Priority is hereby claimed to provisional application Ser. No. 60/660,517, filed Mar. 10, 2005, which is incorporated herein.

BACKGROUND

The economic impact of high fuel costs for shippers is significant. In 2004, the fuel bill for the U.S. trucking industry (collectively referred to as "carriers") was greater than $90 billion. In the immediately preceding year, 2003, the fuel bill for carriers was $76 billion. See *Transport Topics*, Jun. 17, 2005 print edition, "Trucking Fuel Tab Soars," (Transport Topics Publishing Group, Alexandria, Va.). That is a one-year cost increase of greater than 18%. The trend going forward is no less startling, as shown by FIG. 1. FIG. 1 is graph depicting U.S. retail "on-highway" diesel fuel prices from September 2003 to January 2006 (statistics compiled by the U.S Department of Energy). The long-term trend is clearly pointing in the direction of ever-increasing fuel prices. With continuing political instability in oil-producing countries (such as Nigeria, Venezuela, Iran, and Saudi Arabia), continuing military operations in Iraq, and political opposition to drilling in known reserves on U.S. soil (such as in the Artic National Wildlife Refuge), fuel prices are likely to continue their meteoric rise.

Political instability in oil-producing regions and hurricanes impacting U.S. ports on the Gulf of Mexico also contribute mightily to short-term volatility in fuel prices. As shown in FIG. 1, hurricane Katrina (which made land fall on the gulf coast of the United States on Aug. 29, 2005) caused an immediate and severe spike in fuel prices at the pump. Managing such price volatility (to the extent possible) is key for the efficient movement of goods to market. In short, bottom line profit margin for shippers (i.e., the margin of companies moving their goods to market, as opposed to the profit margin of the trucking companies themselves) is inversely proportional, dollar-for-dollar, to shipping costs. In an efficient marketplace, the actual cost of shipping should be closely related to fuel costs. In other words, every dollar saved on fuel costs should be a dollar that goes to the bottom line of the shipper (not the carrier). However, that is not the current situation.

In the United States, common freight carriers (companies such Federal Express, UPS, DHL, etc.), truckload segment carriers (companies such as Schneider, Swift, J.B. Hunt, etc.) and a huge number of other local, regional, national, and international carriers) manage the fluctuating cost of fuel by assessing a "fuel surcharge." Airlines (both passenger and cargo lines) likewise assess fuel surcharges. The surcharge is based upon a formula that uses the average retail cost of fuel (the average cost of diesel for ground carriers; the average cost of jet fuel for air carriers) for a preceding period of time and multiplies it by a sliding scale to arrive at a fuel surcharge that is added to actual cost to ship the goods from the origin to the destination. (The scale can be based on, for example, a percentage of the fuel cost, or per mile traveled, etc.) As a general rule, every surcharge protocol currently in use is based on the average, full retail price of fuel. But the carriers' actual cost for fuel is significantly less because the carriers receive volume discounts for large fuel purchases. Thus, at the time the cost for a shipment is estimated, the carrier provides the estimate based upon the current actual cost, plus the current fuel surcharge. The surcharge functions to inflate the cost of fuel, thereby guaranteeing the carrier a profit (or, at an absolute minimum, preventing the carrier a loss). In essence, by using a sliding scale based on historical and average fuel costs, the surcharge increases the carriers' revenue, based upon the actual amount the carrier paid for fuel. The fuel price spread (that is, the fuel surcharge levied by carriers as compared to the carriers' true cost for the fuel) is a major flaw that financially harms shippers. In short, in the event a carrier's actual fuel costs are higher at the time a shipment is made, the surcharge limits the carrier's costs by assessing the shipper an addition additional fee in excess of the actual cost the carrier paid for the fuel.

The fuel surcharge arrangement, while not calculated in the same fashion from carrier to carrier, has been implemented industry-wide. All of the surcharge protocols follow the same basic approach: a sliding scale is compiled linking the historic cost of fuel to a multiplier. The fuel surcharge is, quite literally, wholly disconnected from the actual price a carrier pays for the fuel required to complete any given shipment. It is simply a charge based upon the national average, full retail, at-the-pump cost for fuel during some pre-set time period preceding the date when the shipment is made. As a result, the fuel surcharge system produces both a cost inflation to shippers (because carriers generally do not pay full retail prices for fuel) and a time distortion (because the surcharge is based on historic average fuel costs, rather than contemporaneous fuel costs at the time the shipment is made). In practice, the amount of fuel required to complete any given movement is computed using the distance in miles between the origin and the destination, multiplied by an agreed upon miles-per-gallon for the vehicle(s) used to transport the freight. For example, in calculating the surcharge for diesel fuel, DHL (a domestic and international carrier) currently utilizes an indexed fuel surcharge based upon the fuel prices published by the U.S. Department of Energy. DHL's diesel fuel surcharge calculation is based upon the spot price for diesel fuel.

For jet fuel, however, DHL uses a different calculation to determine the "appropriate" fuel surcharge. DHL's air shipment fuel surcharge is linked to the monthly rounded average of the U.S. Gulf Coast (USGC) price for a gallon of kerosene-type jet fuel, as published by the U.S. Department of Energy. DHL currently applies the monthly rounded average from the period two months prior to calculate the applicable fuel surcharge percentage. For example, the March 2006 fuel surcharge percentage as calculated by DHL is based on the USGC monthly rounded average from January 2006.

In contrast, UPS (another domestic and international common carrier) uses an index-based surcharge for diesel fuel. UPS's surcharge scale is adjusted monthly. In the current arrangement, changes to the surcharge schedule are effective the first Monday of each month and posted approximately two weeks prior to the effective date. UPS calculates its fuel surcharge based on the National U.S. Average On-Highway Diesel Fuel Prices reported by the U.S. Department of Energy for the month that is two months prior to the adjustment. (See FIG. 1, which is a graph depicting the recent history of this fuel price index.) Thus, for example the surcharge for March 2006 is based on the January 2006 National U.S. Average On-Highway Diesel Fuel Price. In UPS' current schedule (March 2006), the fuel surcharge for diesel ranges from 0% for diesel costing less than $1.50 per gallon, to 5.25% for diesel costing from $3.02 to $3.10 per gallon.

UPS uses an analogous schedule for air freight, the air freight surcharge schedule being linked the USGC price for kerosene-type jet fuel. In UPS' current schedule (March 2006), the fuel surcharge for jet fuel ranges from 0% for jet fuel costing less than $0.66 per gallon, to 12.5% for jet fuel costing more than $1.62 per gallon.

A host of other methods of calculating the surcharge are known. For example, Schneider National (Green Bay, Wis.; currently the largest truckload carrier in North America) bases its surcharge on the Average On-Highway Diesel Prices, adjusted weekly. Thus, for the first week in March 2006, Schneider's fuel surcharge was based on the then-average on-highway price for diesel, $2.545 per gallon. Using the then-standard base cost for fuel ($1.20 per gallon, the cost factored into the charge for the movement itself) yields a differential of $1.345 per gallon in the first week of March 2006. This value is then divided by 5 mpg (the estimated average mileage of Schneider's trucks) to arrive at a surcharge of $0.269/mile. Thus, for a shipment of 1,500 miles, taking place in early March 2006, Schneider National would have levied a fuel surcharge of $403.50.

Literally all US common carriers reserve the right to change their fuel surcharge percentages and thresholds without prior notice. The result is that the fuel costs paid by shippers are not controlled by the shippers. Instead, fuel costs are set by historical rates and the surcharge percentages and price thresholds established (unilaterally) by carriers. As matters presently stand, shippers (for whose benefit the fuel is purchased and consumed) have no control over the cost at which that fuel is purchased. Likewise, shippers have no control over where and when that fuel is purchased. Shippers are therefore paying more than they should to move their goods to market.

Like many businesses, common carriers and shippers alike, are increasing using the internet and other network arrangements, to wring greater efficiencies from their operations. The exponential growth of the internet in the late 1990's, and the continued growth in commerce transacted over the internet, has thus witnessed a corresponding rise in the number of patents addressing methods for conducting commerce via a computer interface. Many of these patents touch on methods for managing fuel costs or for hedging the future cost of fuel (and other commodities). For example, U.S. Pat. Nos. 6,885,996; 6,375,539; and 6,332,128, all to G. R. Nicholson, describe a process for granting price-per-unit discounts on fuel costs. The fuel price discount is linked to the buyer purchasing other, cross-marketed items from the same vendor or from a different vendor.

U.S. Pat. No. 6,965,872, to Grdina, describes a subscription-based service wherein a consumer can purchase fuel in advance, at an agreed upon price, and the seller must deliver the fuel at the agreed upon price. In essence, the system is a debit card arrangement for hedging the purchase price of fuel.

U.S. Pat. No. 6,249,772, to Walker et al., and assigned to Walker Digital, LLC, describes the process behind the "name-your-price" web auctioneer Priceline.com. In this pricing protocol, there is a middleman (the "central controller" in the terms used by the patent) who links buyers and sellers in a double-blind fashion. The buyer is unaware of the seller's asking price, and the seller is unaware of the buyer's offering price. The asking price and the offering price are matched by the "central controller." If the buyer's offered price is higher than the seller's asking price, the sale is consummated, and the difference is pocketed as revenue by the "central controller," i.e., Priceline. But if the buyer's offered price is too low, the sale is not consummated. In either instance, the buyer is never informed of the seller's actual asking price, and vice-versa. The "central controller" makes the decision on whether to make the sale or not, without transmitting the asking price to the buyer, or transmitting the offered price to the seller.

There are a host of other internet commerce selling protocols described in the recent U.S. Patents. To get a flavor of the overall increase in internet-based commerce, see, for example, U.S. Pat. Nos. 6,999,949; 6,970,837; 6,901,376; 6,868,394; 6,868,393; 6,839,683; 6,754,636; 6,745,190; 6,587,827; 6,016,504; 5,966,697; and 5,970,474.

SUMMARY OF THE INVENTION

The present invention is based on: (1) one unassailable fact; and (2) a fundamental shift in managing the cost of fuel. The unassailable fact is that shippers (not carriers) ultimately pay for high fuel costs. But in the current system, shippers have absolutely no control over the cost they pay for fuel. In the current system of fuel surcharges, the carrier chooses where to purchase the fuel, the carrier chooses when to purchase the fuel, the carrier chooses how much to pay for the fuel, and the carrier chooses the fuel surcharge assessed to the shipper. In each step of the current arrangement between shippers and carriers, the shipper, who ultimately pays both the actual cost of the fuel and the fuel surcharge, has absolutely no input on managing this critical element of the cost of production. In short, the current system is inefficient because the control and management of fuel acquisition and distribution is placed in the hands of the sellers (i.e., the trucking companies) rather than the buyers (i.e., the producers shipping their goods to market).

The present invention enable the shipper to be the fuel buyer and decision-maker, rather than the carrier. Using the present invention, the shipper secures access to fuel, in the quantities, at the prices, at the time, and from the fuel merchants of the shippers 'choosing, not the carriers' choosing. The technology described herein (network connectivity, electronic credit transaction processing, etc.) enables this complex transaction to be implemented.

Thus, the preferred embodiment of the invention is directed to a computer-implemented method for managing fuel costs. The method comprises receiving transaction information at a Network Administrator. The transaction information is associated with (or otherwise describes) (a) a shipper who has arranged for a shipment of goods from an origin to a destination, and (b) a corresponding carrier that has agreed to transport the shipment. In the present invention, the carrier agrees to transport the shipment using a pre-determined maximum number of eligible units of fuel. (The number of eligible fuel units may be determined according to an industry-wide standard formula, e.g., the distance between the origin and destination multiplied by a mile-per-gallon figure to arrive at an allotted number of eligible units of fuel for any given movement.) The carrier also agrees to purchase that fuel from pre-selected fueling locations, at a pre-set base price per eligible unit. Of particular note with respect to the pre-set base price per eligible unit of fuel is that the base price is fixed before the shipment is made. This creates a price hedge for the carrier—the carrier knows in advance the reimbursement it will receive for costs associated with fuel. But, in the present invention, it is the shipper (via the Network Administrator) that manages the spread between the carrier's base fuel price and the marketplace cost of the fuel. The maximum number of eligible units of fuel and the base price per eligible unit for the shipment are established between the shipper and the carrier, either by negotiation, via a pre-set schedule, or via any other means mutually agreed upon by the shipper and the carrier. The pre-selected fueling locations where the carrier can purchase fuel are established by the Network Administrator. Carrier fuel purchase information associated with fuel purchases made by the carrier at the pre-selected fueling locations (while delivering the shipment) are then transmitted to the Network Administrator. Transmission of information can be done by any means now known in the art or developed in the future, but is preferably electronically, via a computer communications network (e.g. via the Internet).

The method entails transmitting, compiling, analyzing, storing, and generally manipulating (via computer or other type of processor) two related sets of information: the transaction information and the carrier fuel purchase information. The information contained within the two sets can overlap, so while there are two distinct sets of information, the data contained with each set of information are not mutually exclusive.

The transaction information and the carrier fuel purchase information may comprise one or more identifiers, that is indicia indicating the identity, quantity, quality, type, nature, date and time, location, frequency, etc. of a variable in any given transaction or carrier fuel purchase.

Thus, for example, the transaction information includes identifiers associated with any given shipment arranged between the shipper and the carrier. Thus, the transaction information may include one or more identifiers such as a maximum-number-of-eligible-units-of-fuel identifier, a base-price-per-eligible-unit identifier, and a fueling locations identifier. The transaction information may also include identifiers such as a shipper identifier, a carrier identifier, a shipment identifier, a pick-up date identifier, a delivery-date identifier, an origin identifier, a destination identifier, a route identifier, a sender identifier, a recipient identifier, a date identifier, a time identifier, a location identifier, a fuel merchant identifier, a driver identifier, a vehicle identifier, a vehicle miles-per-gallon identifier, a vehicle odometer identifier, and a vehicle weight identifier.

Similarly, the carrier fuel purchase information comprises identifiers associated with each fuel purchase made by the carrier, such as the number of units of fuel purchased by the carrier and the price per unit paid by the carrier for all units of fuel purchased. The carrier fuel purchase information may also include one or more identifiers such as a shipper identifier, a carrier identifier, a shipment identifier, an origin identifier, a destination identifier, a route identifier, a sender identifier, a recipient identifier, a date identifier, a time identifier, a location identifier, a fuel merchant identifier, a driver identifier, a vehicle identifier, a vehicle miles-per-gallon identifier, a vehicle odometer identifier, and a vehicle weight identifier.

The principal advantage of the present invention is that it provides shippers and carriers with a more accurate picture of fuel costs. The invention provides shippers with both the ability to influence fuel costs and the knowledge that shippers are paying for fuel based on the actual market cost of fuel, and not an inflated and lagging index. Thus, another version of the invention also includes transmitting carrier fuel purchase information from the Network Administrator to the shipper and the carrier. This information is used by the shippers and carriers to settle the fuel purchases made and to account for and to manage their respective fuel costs. In the preferred version of the invention, the carrier fuel purchase information transmitted to the shipper reflects the number of units of fuel purchased and the difference in price (if any) between the base price per eligible unit of fuel and actual price per eligible unit paid by the carrier. The fuel purchase itself is then settled by having the carrier be financially responsible for paying the base price per unit of eligible fuel purchased (a price agreed upon in advance by the shipper and the carrier). The shipper is then held financially responsible for any difference between the base price for the fuel and the actual price paid by the carrier. Any units of fuel purchased by the carrier above and beyond the number of eligible units (agreed upon in advance by the shipper and carrier) are ineligible units, the cost of which is paid for entirely by the carrier.

The method may further comprise transmitting the carrier fuel purchase information to a third party (without limitation, for free or for a fee), usually a financial transaction processing company, such as a credit card, debit card, or check card processor. The financial transaction processors may be hired by the carrier, the shipper, the fuel provider, and/or the Network Administrator to help settle the fuel purchases. Alternatively, a third party such as an insurance company, investor, or market analyst, might also pay the Network Administrator for access to some or all of the carrier fuel purchase information.

In the preferred version of the invention, the carrier fuel purchase information transmitted to the Network Administrator is compiled into a computer-implemented database. Over time, as fuel purchase information is compiled into the database, the database becomes an extremely valuable tool for analyzing the fuel market and shipper/carrier trends and practices. The database may be entirely proprietary, and accessible only by the Network Administrator, or the database may be accessible by third parties (in exchange for a one-time fee, or an on-going subscription).

The invention also includes an apparatus to implement the above-described method. The apparatus according to the present invention includes a processor and a storage device coupled to the processor and storing instructions adapted to be executed by the processor to accomplish the above noted method. Thus, the processor is adapted to execute instructions to receive transaction information, the transaction information being associated with: (a) a shipper who has arranged for a shipment of goods from an origin to a destination; and (b) a corresponding carrier that has agreed to transport the shipment. Again, the carrier agrees to make the shipment using: (i) a pre-determined maximum number of eligible units of fuel; (ii) wherein the fuel is purchased by the carrier at a pre-set base price per eligible unit; and (iii) wherein the fuel is purchased from pre-selected fueling locations. The maximum number of eligible units of fuel and the base price per eligible unit for making the shipment are established between the shipper and the carrier, and the fueling locations are established by the Network Administrator. Carrier fuel purchase information associated with fuel purchases made by the carrier at the pre-selected fueling locations are transmitted to the Network Administrator.

Lastly, the invention includes a medium storing instructions adapted to be executed by a processor to perform the method for managing fuel costs as described herein.

DETAILED DESCRIPTION OF THE INVENTION

Figure 1:
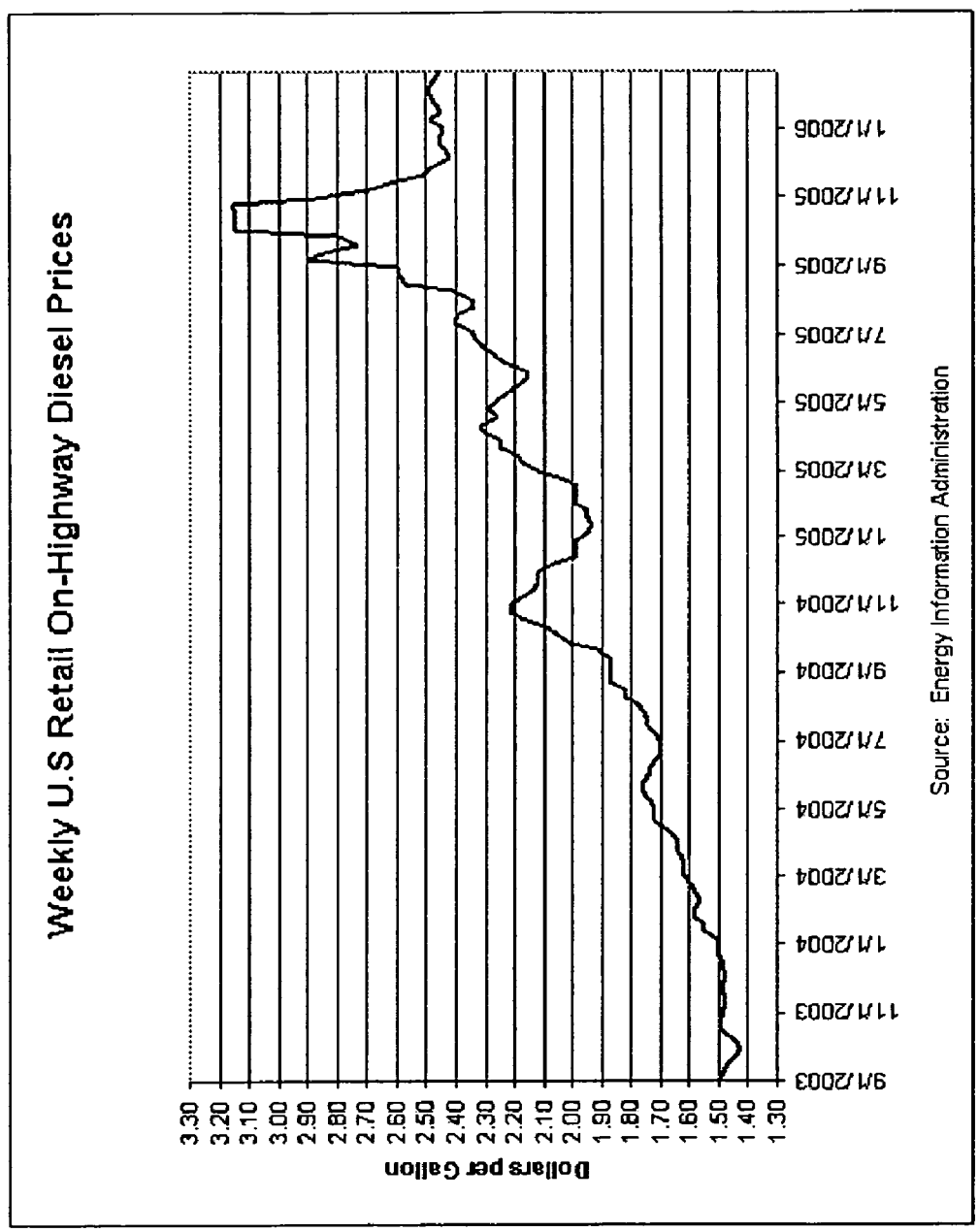
FIG. 1 is a graph depicting weekly U.S. retail on-highway diesel prices for the period Sep. 1, 2003 to Jan. 1, 2006 (data provided by the U.S. Department of Energy).

The following terms are explicitly defined as follows. All other terms not given an explicit meaning herein are to be given their conventional and accepted definition in the transportation industry.

The terms "carrier" or "common carrier" are synonymous and refer to a transporter (i.e., a company or an individual) that holds itself out to the general public for the transportation of goods over a definite route and according to a regular schedule. Thus, a "carrier" is any company or individual who transports the goods of another for a fee. The term "carrier" explicitly encompasses, without limitation, transporters moving goods by any means (land-based vehicles, water-based vehicle, aircraft, and spacecraft, all without limitation), and through any terrain (land, water, air, space). "Carrier" includes, without limitation, local, regional, national, and international transporters. (The term "common carrier" is something of a holdover from the common law. At common law, a common carrier is held liable for all losses which may occur to property entrusted to his charge during the act of storage or transport.)

The term "fuel" denotes, without limitation, any fuel, fuel additive, or fuel adjunct used to power any type of vehicle (land, sea, air, space), without limitation. Thus, as used herein, the term "fuel" explicitly encompasses, without limitation: petroleum-based fuels such as gasoline, diesel, kerosene, jet fuel, benzene, naphtha, fuel oil, bunker oil, marine fuel, residual fuel, compressed natural gas, methane, propane, and the like; fuel additives such as methyl-tertbutyl ether (MTBE) and tetraethyl lead (TEL); biomass-derived fuels, such as methanol, ethanol and bio-diesel; combustible natural fuels such as biomass, wood, and coal; compressed hydrogen and oxygen to be used in fuel cells or spacecraft; and solid rocket fuels such as ammonium perchlorate-based fuels (generally a combination of ammonium perchlorate and aluminum powder dispersed in a polymeric binder such as polybutadiene-acrylonitrile copolymer or hydroxyl-terminated polybutadiene.)

The term "shipper" denotes any organization or individual (without limitation) that engages a "carrier" to move goods from an origin to a destination.

The present invention is described with reference to flowcharts and/or diagrams that illustrate methods, apparatus or systems and computer program product. Each block of the various flowcharts, and combinations of blocks in the flowcharts, can be implemented by computer program instructions. Such computer program instructions can be loaded onto a general-purpose computer, special purpose computer, or other programmable data processing device to produce a machine, such that the instructions that execute on the computer or other programmable data processing apparatus create means for implementing the functions specified in the flowcharts. The computer program instructions can also be stored in a computer-readable memory that directs a computer or other programmable data processing device to function in a particular manner, such that the instructions stored in the computer-readable memory produce an article of manufacture including instruction means which implement the function specified in the flowcharts or diagrams. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowcharts or diagrams.

It will be understood that blocks of the flowcharts support combinations of systems for performing the specified functions, combinations of steps for performing the specified functions, and program instructions for performing the specified functions. Each block of the flowcharts or diagrams, and combinations of blocks in the flowcharts or diagrams, can be implemented by special-purpose, hardware-based computer systems which perform the specified functions or steps, or combinations of special-purpose hardware and computer instructions.

The present invention can be implemented using any computer programming language, now known or developed in the future. Likewise, various computers and/or processors may be used to carry out the present invention without being limited to those described herein. The present invention can be implemented on conventional desktop computers, such as "IBM"-brand or IBM-compatible or "APPLE"-brand or "MACINTOSH"-brand personal computers, utilizing suitable operating systems (e.g., "WINDOWS"-brand operating system, Linux, and the like). ("IBM" is a registered trademark of International Business Machines Corporation, "APPLE" is a registered trademark of Apple, Inc., "MACINTOSH" was once a registered trademark of Apple, Inc. for personal computers, but is now an unregistered mark, "WINDOWS" is a registered trademark of Microsoft Corporation.) The present invention can also be implemented using other types of computers and/or processors, including, but not limited to, mainframe computers, parallel computer arrays, and the like.

The present invention is an innovative shipper-based fuel program that enables shippers to manage and take control of their fuel-related transportation costs. It is based on a simple concept, namely that shippers pay for fuel costs, not carriers. Therefore, shippers should control fuel-provisioning programs, not carriers. The crux of the present invention is that shippers, not carriers, control and manage their fuel costs when shipping their goods by common carrier. In short fuel logistics are placed in the hands of those who bear the economic impact of high fuel prices and fuel price volatility, namely shippers, not carriers.

As noted earlier, the economic impact of high fuel costs for shippers is significant: $90 billion in 2004. A significant portion of this expense is being borne directly by shippers. In 2004, fuel surcharges assessed by trucking companies to shippers added an average of 14% to freight bills for truckload shipments. See Scott Traffic Company Consultants, August 2004 Report. With the US truckload freight bill estimated at $234.24 billion in 2004 by the American Trucking Association, shippers thus paid more than $30 billion in fuel surcharges in 2004. That point bears repeating: fuel surcharges alone (not actual fuel costs, but the surcharge assessed by carriers) added upwards of $30 billion annually in increased costs for US shippers to move their products to market.

These high fuel surcharges are impacting both shippers' cost of moving goods to market, as well as shippers' bottom-line financial results. And while fuel surcharges have become a significant cost for shippers, short of operating their own delivery fleets, it is a cost that shippers can neither manage, nor influence, under the present surcharge regime. Under the current industry standard, carriers implement their own fuel surcharge programs. These programs are put in place by carriers, with the carriers looking at their own competition, i.e., other common carriers. The financial results of the carriers' customers (that is, the shippers) are given little or no consideration when carriers formulate their fuel surcharge programs.

The present invention changes this paradigm and enables shippers to reduce their cost of moving products to market and to take control of their fuel-related expenses. The present invention accomplishes this by eliminating the conventional carrier-based fuel surcharge program and replacing it with an innovative, computer-implemented, shipper-based fuel management process. The present invention thus puts the shippers in control of the critical fuel-purchasing and provisioning decisions that impact their go-to-market costs.

Control of these expenses is critical for shippers to lower their fuel-related expenses, and thereby increase their profits. While having the shippers take control of these expenses does not impact the actual market price for fuel (neither shippers nor carriers have the power to alter market prices for fuel), having shippers (rather than carriers) manage the fuel costs significantly lowers the actual cost that a shipper pays to move its goods to market. This outcome is due to the fact that shippers have an inherent and powerful motivation to lower fuel costs: high fuel costs negatively impact shippers' revenues. (In contrast, carriers treat fuel costs as a pass-through expense that is ultimately paid by the shippers. Thus carriers do not have the same economic motivation that shippers do to keep fuel costs as low as possible.) The reduction in total costs incurred by the shipper in using the present invention is also due, in part, to fundamental flaws in the current fuel surcharge protocols. Specifically, the conventional fuel surcharge programs do not accurately represent the shippers' true cost of fuel for moving products to market. As explained below, fuel surcharge programs are artificially slanted to favor carriers' revenues, rather than shippers' revenues.

The Fuel Surcharge: A Carrier-Based Program:

The current, industry-standard fuel surcharge program focuses on the carrier's ability to recover from its customers (the shippers) the excess cost of fuel above and beyond a price included in the carrier's quoted transportation rates.

The process for a typical fuel surcharge program is as follows:

The carrier and the shipper negotiate transportation rates for freight movements. The negotiated transportation rate includes a fuel surcharge schedule.

As noted earlier, the fuel surcharge is a sliding schedule that provides for an additional charge to be added to the transportation charges, based on a fuel price formula. The typical formula includes a base price-per-gallon that is included in the transportation charge and compares it to an industry-wide index to determine the cost of fuel that is added to the freight transportation bill.

A typical calculation of the fuel surcharge appears as follows. (The values contained in this example are generally representative of the US market as of March 2005. The values are not representative of any particular company):

Base price-per-gallon included in the freight transportation charge: $1.20 per gallon Actual price-per-gallon is based on the Department of Energy Index Weekly Retail On-Highway Diesel Prices (see FIG. 1).

Compare the base price-per-gallon to the DOE average to determine the difference.

Calculate the difference by an agreed upon miles-per-gallon figure to determine the surcharge to be added to the freight bill.

The shipper tenders its freight to the carrier based on the negotiated freight rates.

The carrier transports the freight tendered by the shipper and determines the transportation service charge to be assessed to the shipper for the service (i.e., for safely moving the freight from origin to destination).

The carrier then calculates the fuel surcharge and adds it to the transportation service charges to determine the total cast to complete the freight movement.

The shipper pays the carrier for both the transportation service charges and the fuel cost, including the fuel surcharge.

The entire transaction, which is representative of conventional industry practice in the US, is summarized in Table 1:

TABLE I

A FUEL SURCHARGE EXAMPLE

Freight Movement:

| | |
|---|---|
| Origin: | Green Bay, WI |
| Destination: | Jacksonville, FL |
| Miles: | 1,322 |
| Rate: | $1.50/mile |
| Ship Date: | Jan. 31, 2005 |

Freight Transportation Cost = Miles (1,322) × Rate ($1.50) = $1,983.00

Fuel Surcharge Cost (FSC):

| | |
|---|---|
| Base Price/Gallon: | $1.20 |
| DOE Index (as of Jan. 31, 2005): | $1.992 |
| Per Gallon Difference: | $0.792 |
| MPG Assumption: | 6 mpg |

Fuel Surcharge Cost = {$0.792 ÷ mpg (6)} × Miles (1322) = $174.50
Total Freight Cost = Freight ($1983.00) + FSC ($174.50) = $2157.50

There are several distinct flaws with this fuel surcharge methodology:

First, it is an industry-average pass-through set by the carrier. Whether the shipper is large and "purchases" a high volume of fuel to move its products to market or the shipper is small and "purchases" a relatively small amount of fuel, the surcharge is the same. There is no ability to leverage a shipper's volume to obtain favorable fuel pricing.

Second, the shipper has no ability to influence short- or long-term fuel prices. Shippers cannot negotiate better fuel pricing, cannot determine where to fuel, cannot choose when to fuel, cannot choose from whom to purchase fuel, and cannot create a long-term strategy to manage fuel costs and provisioning.

Third, the fuel surcharge is based on full retail, at-the-pump pricing. Here is where the fuel surcharge system is heavily slanted in favor of carriers, to the detriment of shippers. The retail, at-the-pump price is nowhere near the best price available for fuel in the marketplace. In fact, retail, at-the-pump prices are the highest prices paid for fuel in the marketplace. The sophisticated carriers do all that they can not to pay full-retail, at-the-pump prices for fuel. When a carrier buys fuel smartly (i.e., at prices significantly under the full retail price), the carrier makes an additional profit on the fuel surcharge because the fuel surcharge is based on the retail price, regardless of how much the carrier actually pays for the fuel. Alternatively, when a carrier does not buy fuel smartly, it is the seller of the fuel who makes extra profit. In both instances, the shipper is subsidizing artificially high fuel costs at the shipper's own expense.

The economic burden of high fuel costs—that is, the real dollars spent to purchase fuel—is borne by the shippers, not the carriers. However, under the current fuel surcharge paradigm, control for how well this money is spent rests entirely in the carriers' hands. This creates an inherent flaw, commonly known as having the fox guard the hen house. Carriers control how, when, and at what price the fuel is purchased, while at the same time assessing a fuel surcharge (calculated unilaterally) to protect themselves against the volatility of fuel prices. All the while, the shippers are subsidizing artificially high fuel costs to the detriment of their earnings and the cost of moving products to market.

The present invention addresses this basic economic flaw. It puts the control of fuel costs into the hands of the party that bears the economic burden of fuel costs: the shippers.

The "Breakthrough" Fuel Solution:

The present invention is an innovative, computer-implemented, shipper-based fuel management program that addresses the inherent flaws of today's carrier-based fuel programs. The invention provides a host of significant advantages for shippers:

A principal advantage of the present invention is that it reduces the fuel-related cost of moving products to market by replacing an artificial fuel surcharge subsidy with an actual fuel cost that can be managed by the shipper.

Another advantage of the invention is that it enables the shipper to take control of fuel-related costs, thereby enabling the shipper to influence these costs, e.g., by negotiating prices, by making decisions on providers and locations, and by taking long-term positions with respect to fuel acquisitions. With this control, the shipper can develop a long-term fuel strategy, be it simply tracking the market fluctuation of fuel costs more closely, establishing a fixed average price for fuel (using futures contracts), or something in between.

Another advantage of the present invention is that it creates a competitive market advantage for the shipper. By lowering the cost of moving products to market, and thereby lowering the price of (or raising profit margin on) those products, the present invention creates an opportunity for shippers to gain a market advantage.

Moreover, the advantages of the present invention are not solely for the shippers. The present invention also offers carriers an innovative fuel program that can convert one of their most volatile operating expenses into a fixed cost. This advantage is particularly true (and valuable) for small- and mid-sized carriers. Smaller carriers do not have the market leverage to negotiate fuel prices to the extent that the large carriers do. Despite controlling almost 60% of the total industry capacity, small- and mid-sized carriers have a distinct market disadvantage when it comes to negotiating low fuel costs as compared to large carriers. Thus, the present invention levels the playing field between smaller carriers and larger carriers by enabling small carriers to be more cost competitive on fuel.

There are three components to the present invention program: the Fuel-for-Freight Network, the Fuel Information System, and Strategic Fuel Programs. The key characteristics of each of these components are described below.

The Fuel-For-Freight Network:

The Fuel-for-Freight Network is a retail fuel network that enables shippers to provide fuel to carriers in support of their freight movements. This important shift in thinking and acting—shippers making fuel available to carriers—provides the foundation for the present invention and creates the opportunity for reducing the cost of moving products to market.

The Fuel-for-Freight Network creates the opportunity for fuel cost savings based on several important principles of the present invention that do not exist with the current fuel surcharge programs:

First, shippers should never pay more for fuel than the actual cost of the fuel required to move their freight from origin to destination. Thus, in the present invention, the shipper pays based on the actual fuel cost associated with a freight movement. This is in stark contrast to conventional fuel surcharge protocols, where the shipper pays based on the full-retail Department of Energy index that is in effect the week (or even the month) of the shipment. Both the undiscounted nature of the index and the reporting delay can cause a significant gap between the actual price a carrier pays for fuel and the inflated price the shipper pays to the carrier.

Second, shippers should benefit from the volume leverage that they provide to carriers. Thus, in the present invention, the price for fuel is based on the total volume of fuel acquired by the Fuel-for-Freight Network. In short, the shipper benefits not only from its own freight volume, but also from the freight volume of all of the shippers on the Fuel-for-Freight Network. Again, this is in stark contrast to conventional fuel surcharge protocols, where the price for fuel is based on the full retail, at-the-pump prices, regardless of whether the shipper is making a one-time shipment or thousands of shipments per year. Under the current fuel surcharge regime, when a shipper is making thousand of shipments per year, it is the carrier that leverages the shipper's volume to obtain fuel price discounts (and the benefit of those discounts extends to the carriers, not the shippers). In effect, rather than getting a volume discount, a shipper's high freight volume creates an even larger price gap between the amount the carrier pays for fuel versus the inflated fuel price the carrier charges to the shipper. This is the true market perversion caused by the present fuel surcharge protocol.

Third, the shippers' payments for fuel should create more carrier options for the shipper, rather than fewer carrier options. In the present invention, all carriers moving freight for the shipper benefit from the shipper's Fuel-for-Freight program. Smaller carriers are able to provide more competitive pricing as compared to larger carriers because the smaller carriers are now competitive on fuel costs. Both large and small carriers purchase fuel for the same price from the Fuel-for-Freight Network. Increasing the competitiveness of small carriers creates additional capacity options for shippers. In short, it gives shippers a large selection of carriers to choose from to transport their goods from origin to destination.

This benefit to shippers cannot be underestimated because "transportation," while generic in the sense of moving goods from point A to point B, is not a generic industry because of the vast differences in the goods being transported. There is a world of difference between transporting dry goods versus liquid goods, between transporting gasoline vs. liquid propane vs. compressed gasses vs. fresh milk; between transporting non-food items versus food items, between transporting canned goods versus livestock, between transporting fragile items versus robust items, etc. It is a rare carrier company (if any even exists) that can handle all of the above types of freight, all of which are regularly transported by truck on US highways. A greater selection of carriers, all purchasing fuel at uniform rates reflective of the true price the market will bear, gives shippers access to smaller, niche carriers that have expertise and experience in transporting specific types of goods.

In stark contrast, under the current fuel surcharge protocols, small carriers are unable to negotiate significant fuel discounts. Thus small carriers currently have a significant cost disadvantage as compared to the large carriers. This issue is a growing public policy concern, to the point that mandatory fuel surcharges, in support of small carriers, have been proposed (but were ultimately turned back) in several recent Congresses. See HR4441 (in 2000), HR2161 (in 2001), and S1914 (in 2002).

These principles provide shippers with important benefits in support of their transportation programs. These principles both the lower total cost of moving freight to market and creates additional capacity options for the shipper.

Implementing the Fuel-for-Freight Network and obtaining these benefits is easy for the shipper. The present invention proceeds as follows, with reference being made to the schematic diagram shown in FIG. 3:

First, one or more carriers are enrolled into (or subscribe to) the Fuel-for-Freight Network. This can be done at the behest of a particular shipper, or the carrier can simply enroll or subscribe to the Network at its own behest.

The Network Administrator coordinates implementation with the carrier. This includes a map or spread sheet showing the Fuel-for-Freight locations where fuel can be purchased by the carrier, the purchase process (which can be integrated using the carrier's existing transaction card system (e.g., credit or debit cards) or by providing new cards for use solely within the Fuel-for-Freight Network, the fuel invoicing process (including credit limits), training and education materials, and contact information. The Network Administrator may also supply a preferred or mandatory trucking lane (i.e., a preferred or mandatory route between origin and destination) that the carrier must follow. By enabling the Network Administrator to suggest preferred lanes, or to impose mandatory lanes, the Administrator can minimize the miles traveled (and hence the fuel consumed) on any given shipment.

The shipper then assigns a particular shipment to one of the carriers enrolled within the Fuel-for-Freight Network. The shipper supplies a copy of the assignment to the Network Administrator, preferably electronically using any communication means now known or developed in the future (e.g., via internet or other computer network, telephonically, via radio, etc.). The assignment includes the particulars of the shipment being made: e.g., origin, destination, goods being shipped, weight of goods, pick-up date, deliver-by date, and any other special handling instructions or conditions.

The carrier moves the freight for the shipper and invoices the shipper for the freight movement only. In the present invention, the carrier does not assess any charge for fuel; no actual fuel cost, no fuel surcharge. The carrier charges the shipper only for the service cost of moving the shipment from origin-to-destination. Because the carrier must fuel his vehicle at an approved Fuel-for-Freight fueling station, the cost of fuel is paid by the shipper, and the location where fuel is provisioned is also selected by the shipper (via the Fuel-for-Freight Network).

The carrier must fuel his vehicle at an approved Fuel-for-Freight fueling location. The carrier is then invoiced at a fixed base fuel price-per-gallon negotiated between the shipper and the carrier. The quantity is based on the miles and standard fuel consumption for the freight hauled on behalf of the shipper. Of particular importance in the present invention is that the carrier does not need to purchase fuel specifically for the individual transportation assignment being executed. In the present invention, the carrier receives credits to purchase the quantity of fuel required to move the shipper's particular assignment at hand. However, additional fuel can be purchased on the Network at an agreed upon fixed-price over the Network's cost.

The shipper is billed by the Network Administrator for any differential in the base rate and the actual cost of the fuel.

The Network Administrator compiles the data generated by fuel purchases and shipments moving through the Fuel-for-Freight Network, and can provide shippers and carriers with detailed reports. These reports enable shippers and carriers to gain a better understanding of their fuel logistics.

The benefits of the Fuel-for-Freight Network begin with the very first assignment by the shipper and expand with every new assignment and new carrier added to the network. Table 2 presents a model transaction as it is handled within the Fuel-For-Freight Network (again using a Green Bay, Wis. to Jacksonville Fla.

TABLE 2

A FUEL-FOR-FREIGHT NETWORK EXAMPLE

Freight Movement:

| | |
|---|---|
| Origin: | Green Bay, WI |
| Destination: | Jacksonville, FL |
| Miles: | 1,322 |
| Rate: | $1.50/mile |
| Ship Date | Jan. 31, 2005 |

Freight Cost: Miles (1,322) × Rate ($1.50) = $1,983.00

$F^3$ Network Cost:

| | |
|---|---|
| Assumptions: | Fuel Tank Capacity: 200 gallons |
| MPG: | 6 mpg |
| Base Price/Gallon: | $1.20 |
| Eligible Gallons: | 220.33 gallons (requiring a min. of 2 fuelings) |

Fueling Stop 1, Network Location - Indiana:*

| | |
|---|---|
| Eligible Gallons: | 220.33 |
| Gallons Fueled: | 100 |
| Network Price: | $1.786 |
| Total Cost of Fuel: | $178.60 |
| Carrier Cost of Fuel: | $120.00 ($1.20 × 100 gallons) |
| Shipper Cost of Fuel: | $58.06 (Network price – base price × 100 gal.) |

Fueling Stop 2, Network Location - South Carolina:*

| | |
|---|---|
| Eligible Gallons: | 120.33 |
| Gallons Fueled: | 150 |
| Network Price: | $1.795 |
| Total Cost of Fuel: | $269.25 |
| Carrier Cost of Fuel: | $197.65 |

$1.20 per ga. × 120.33 eligible ga. + $1.795 Network per ga. price × 29.67 ineligible gal.

| | |
|---|---|
| Shipper Cost of Fuel: | $71.60 (Network price – base price × 120.33 eligible gal.) |

Total Shipper Fuel Cost = $129.66
Total Freight Cost = Freight ($1,983.00) + Fuel ($129.66) = $2,112.66

*The Network prices contained in this example are the actual prices on the dates noted.

Table 3 presents a comparison of the total shipping costs incurred by the shipper under the current fuel surcharge protocol (as illustrated in Table 1 above) and under the present invention (as illustrated in Table 2).

TABLE 3

PRESENT INVENTION VS. FUEL SURCHARGE PROGRAMS

Conventional Fuel Surcharge Example (Table 1):

| | |
|---|---|
| Total Movement Cost: | $2,157.60 |
| Total Freight Cost: | $1,983.00 |
| Total Fuel Cost: | $ 174.50 |

Fuel-For-Freight Network Example (Table 2):

| | |
|---|---|
| Total Movement Cost | $2,112.66 |
| Total Freight Cost | $1,983.00 |
| Total Fuel Cost: | $ 129.66 |

Comparative Analysis:

| | |
|---|---|
| Fuel Savings with the Network: | $ 44.84 |
| % Savings on Fuel: | 25.7% |

A striking feature of Table 3 is that under both the conventional fuel surcharge protocol and the present invention, the carrier is paid the same amount of money for the carrier's actual services to move the freight: $1,983. Without the artificially inflated fuel costs generated by conventional fuel surcharge schedules, and with the strengthened buying position of the shipper (afforded by using the present invention), the shipper pays 25.7% less for his fuel costs for the same exact shipment.

Figure 2:
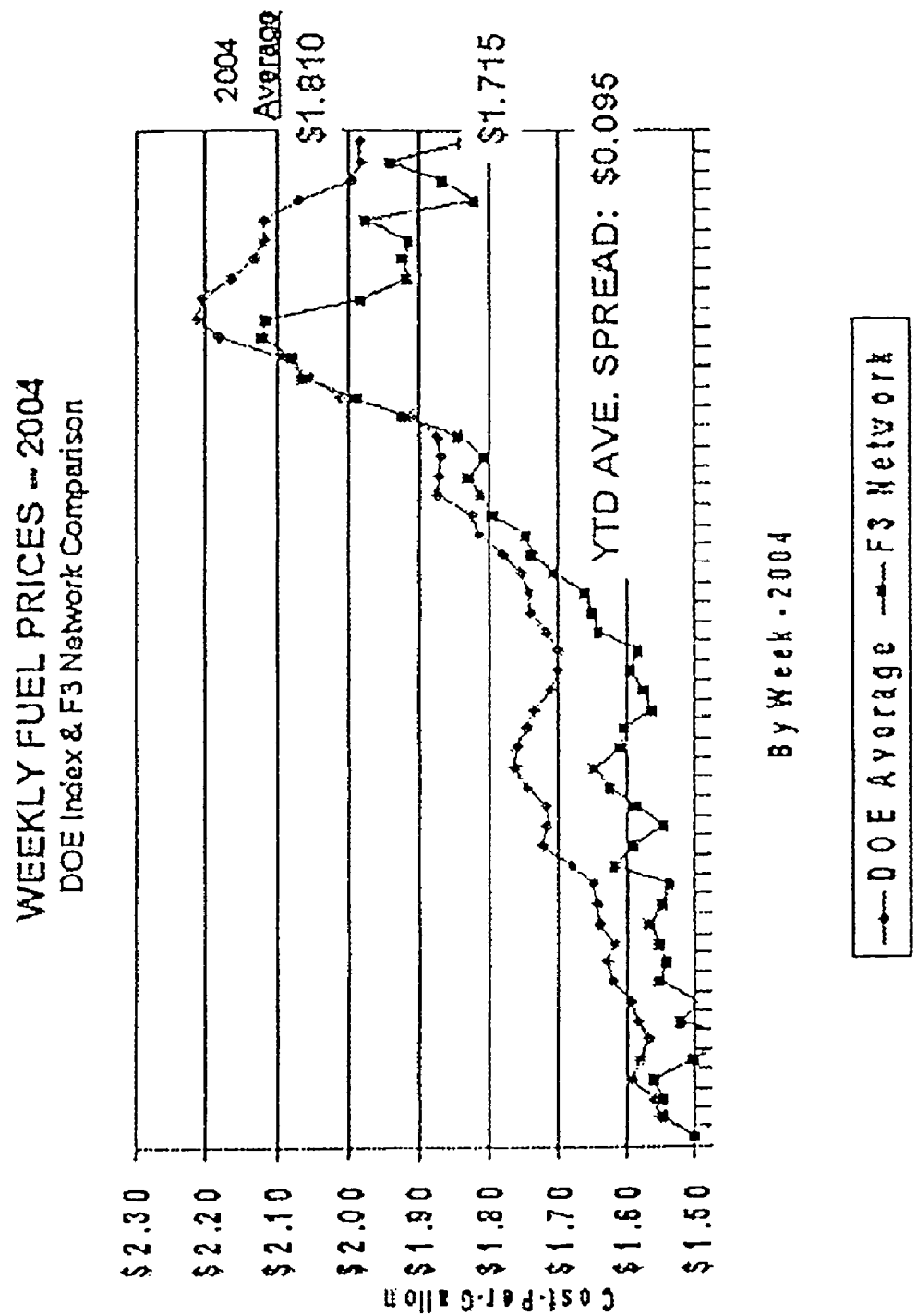
FIG. 2 is a graph comparing the weekly U.S. retail on-highway diesel prices for calendar year 2004 (DOE data) and corresponding fuel prices obtainable using the present invention.

FIG. 2 is a graph depicting how the cost savings using the Fuel-for-Freight Network would accumulate over a course of months and years. Shown in FIG. 2 is the average fuel costs paid using the conventional fuel surcharge approach now assessed by carriers. Overlaid on the same graph are the corresponding costs that would have been paid by shippers using the present invention. Again, the carrier would have been paid the same amount of money for the carrier's actual services to move the freight. But the cost of fuel (a cost ultimately borne by the shipper) is vastly less using the present invention.

Figure 3:
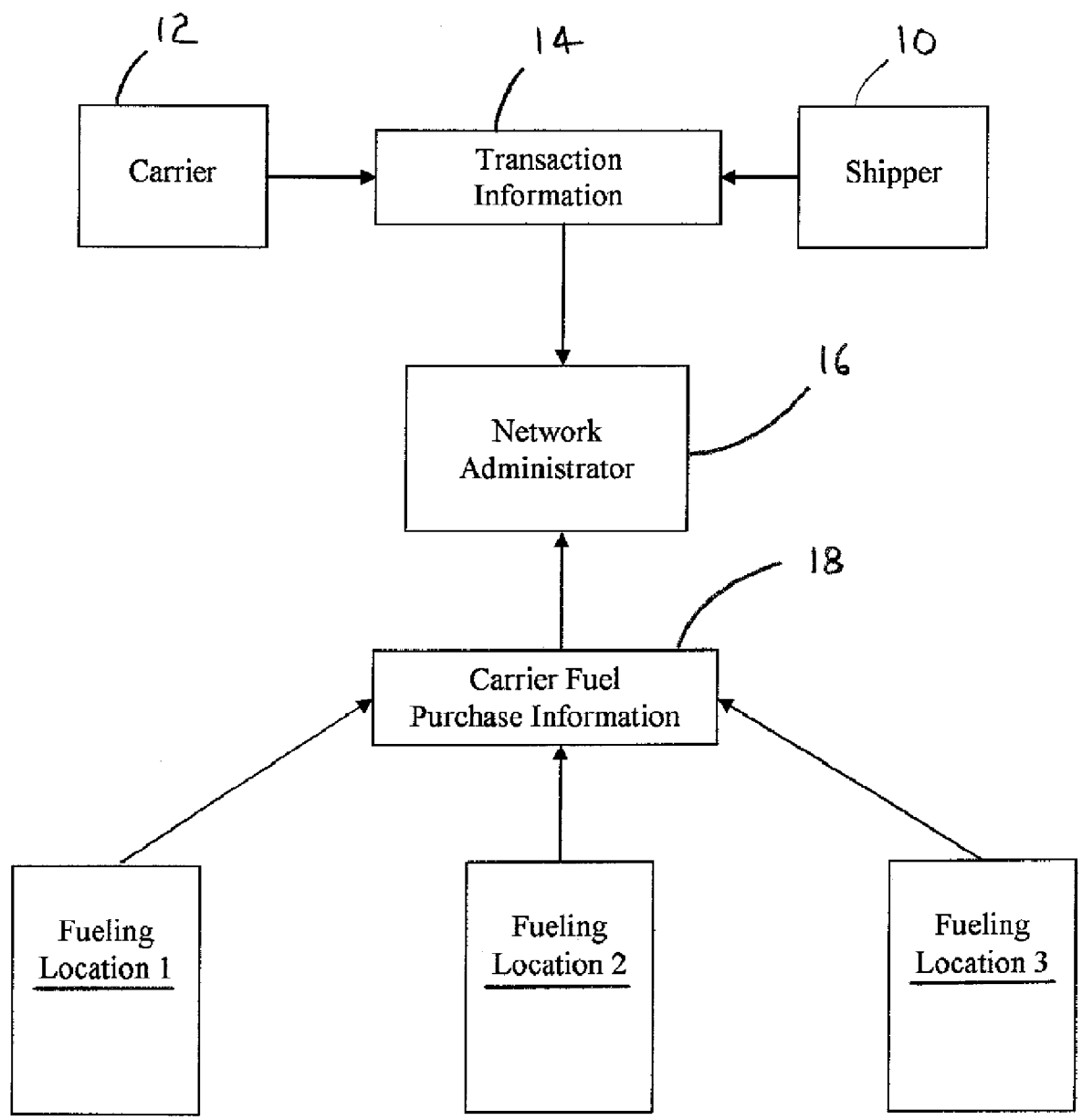
FIG. 3 is a flow chart of a first version of the present invention.
Figure 4:
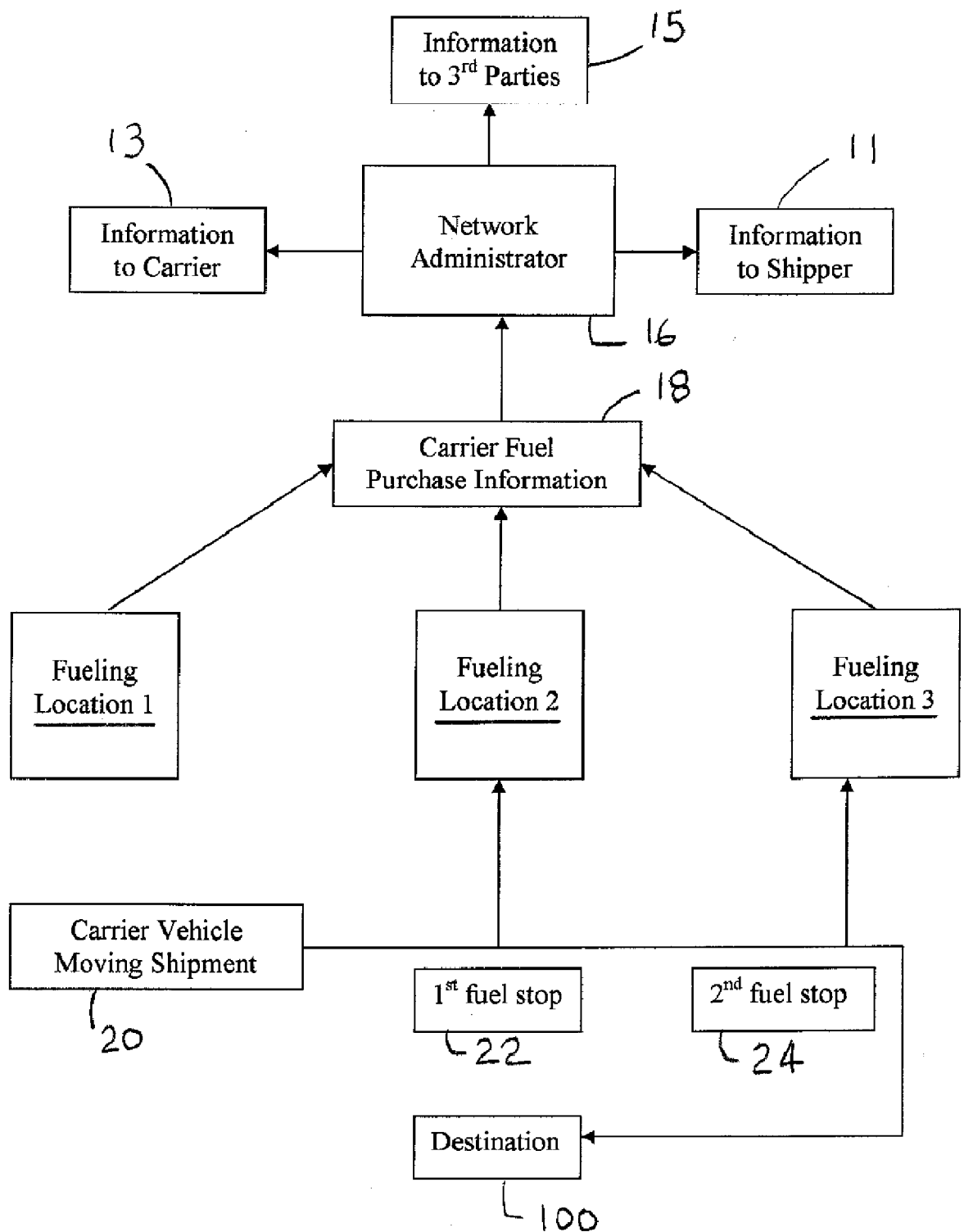
FIG. 4 is a flow chart of a second version of the present invention.
Figure 5:
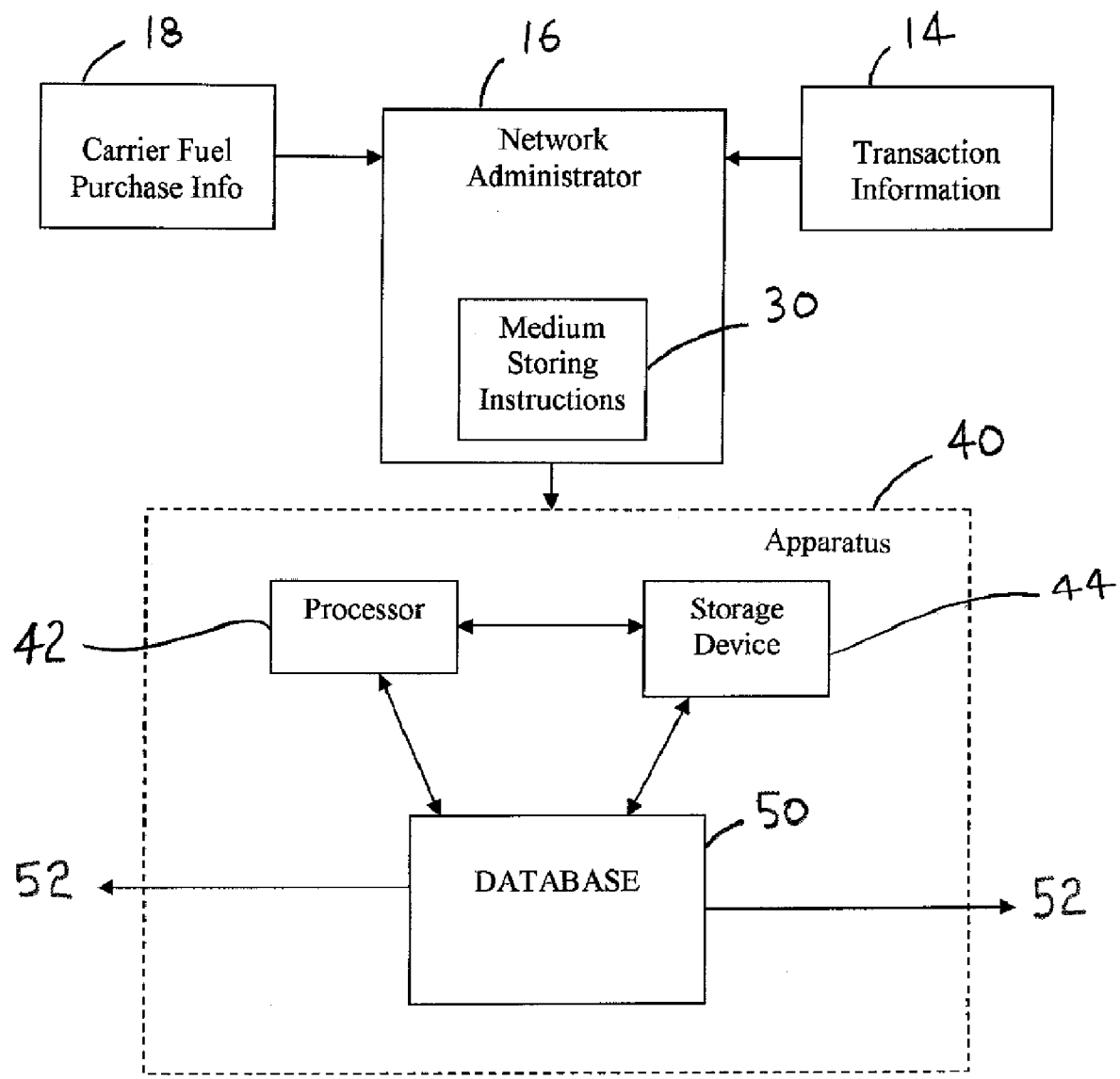
FIG. 5 is a flow chart of a third version of the present invention.

The steps and flow of information in the present invention are depicted in FIGS. 3, 4, and 5, where the same reference numbers are used throughout the three figures to represent the same elements. When referring to the figures, the terms "user" or "subscriber" or "member" refer to a participant within the Fuel-for-Freight Network, including shippers, carriers, fuel providers, and financial institutions that process the financial aspects of any given fuel purchase. The component parts forming the Fuel-for-Freight (computers, processors, connections, apparatus for transmitting, storing and manipulating information, etc.) will be readily understood by those skilled in the art of computer programming, credit card processing, and computer data processing systems. Accordingly, for purposes of brevity only, detailed discussions of such component parts are omitted.

Users may also receive information from the Network, or transmit information to the Network via any means now known in the art or developed in the future, including a personal computer interfaced to the world-wide web, a WEB-TV device, a telephone, a facsimile machine, a personal digital assistant, a screen-phone or any appropriate device to communicate with the Network Administrator.

In terms of the couplings and connections found in the Network, any type of connection, be it a physical "land line" or a wireless connection, or any other type of connection now known or developed in the future may be used. The connections are shown as arrows in FIGS. 3, 4, and 5. The term "connected" explicitly denotes "operationally connected," meaning that computers and processors that are connected are able to transmit and receive information from one another and to process that information where appropriate. FIGS. 3, 4, and 5 illustrate the interconnections that allow for the functionality and interoperability of the component parts forming the Fuel-for-Freight Network apparatus.

In particular, user computers may be coupled to the Network via a link which is a line such as a telephone line, an ISDN line, or a modem line or may be any other network connection or line (e.g., a T1 or T3) that will allow data communications between a user and the Network. The user's computer may comprise either a dedicated end-user computer, a network node such as one employing TCP/IP protocols and having a network IP address, or possibly a network of users such as a corporate fuel seller having multiple fueling stations coupled together in some form of computer network arrangement.

Links allow for the communication of transaction information and fuel purchase information such as carrier identification, driver identification, vehicle identification, amount of fuel purchased, price of the fuel, time the fuel was purchased, location of the purchase, the type of fuel purchased, etc.

Referring now to FIG. 3, which is a flow chart illustrating the present method, a carrier 12 and a shipper 10 agree on terms for the carrier to move a shipment from an origin to a destination. The terms of the shipment are designated as transaction information 14. The transaction information 14 comprises identifiers that describe one or more characteristics of the shipment to be moved by the carrier 12. Thus, the transaction information may comprise (without limitation) one or more identifiers, such as a maximum-number-of-eligible-units-of-fuel identifier, a base-price-per-eligible-unit identifier, and a fueling locations identifier.

Other possible transaction identifiers for the transaction information 14 include a shipper identifier, a carrier identifier, a shipment identifier, a pick-up date identifier, a delivery-date identifier, an origin identifier, a destination identifier, a route identifier, a sender identifier, a recipient identifier, a date identifier, a time identifier, a location identifier, a fuel merchant identifier, a driver identifier, a vehicle identifier, a vehicle miles-per-gallon identifier, a vehicle odometer identifier, and/or a vehicle weight identifier.

All or a portion of these identifiers (that is, all of the transaction information gathered, or only a portion of the transaction information) is transmitted to the Network Administrator 16.

At this point, the movement of the freight commences, as described above with respect to Table 2. The carrier vehicle (car, truck, plane, etc.) fuels when necessary, but only at pre-selected fueling locations, such as fueling locations 1, 2, or 3, as shown in FIG. 3.

When the carrier vehicle does stop for fuel, carrier fuel purchase information 18 associated with each purchase of fuel is gathered and transmitted (partially or in full) to the Network Administrator.

Similar to the transaction information, the carrier fuel purchase information comprises identifiers that describe one or more characteristics of the fuel purchase. At a minimum, it is preferred that the carrier fuel purchase information comprises identifiers for the number of units of fuel purchased by the carrier and a price per unit paid by the carrier for all units of fuel purchased. The carrier fuel purchase information may include a host of other identifiers, including a shipper identifier, a carrier identifier, a shipment identifier, an origin identifier, a destination identifier, a route identifier, a sender identifier, a recipient identifier, a date identifier, a time identifier, a location identifier, a fuel merchant identifier, a driver identifier, a vehicle identifier, a vehicle miles-per-gallon identifier, a vehicle odometer identifier, and/or a vehicle weight identifier.

All or a portion of these identifiers (that is, all of the carrier fuel purchase information 18, or only a portion of the carrier fuel purchase information 18) is transmitted to the Network Administrator 16.

Referring now to FIG. 5, the Network Administrator 16 can compile and manipulate the accumulated transaction information 14 and carrier fuel purchase information 18, via an apparatus 40. The apparatus includes a processor 42, and a storage device 44 coupled to the processor and storing instructions adapted to be executed by the processor to accomplish the method described herein. The Network Administrator 16 may also maintain a medium 30 that stores instructions adapted to be executed by the processor 42 to perform the method for managing fuel costs as described herein.

As shown in FIG. 5, the apparatus 40 can be used to compile a computer-implemented database 50. Information, shown by arrows 52 in FIG. 5, can be extracted from the database 50 by any of the users or subscribers to the Fuel-for-Freight Network. Or the information 52 can be purchased by unrelated third parties.

As shown in FIG. 4 (which illustrates the example shipment described above and tabulated in Table 2), a carrier vehicle 20 is engaged to move a shipment to a destination 100. On its way, the vehicle 20 stops twice for fuel, a first stop 22 at fueling location 2 and a second stop 24 at fueling location 3. At both stops, the carrier fuel purchase information 18 associated with each purchase is transmitted to the Network Administrator. The information so gathered can then be compiled, manipulated, analyzed, segregated, or simply transmitted in raw form as information to/for the carrier 13, information to/for the shipper 11, and information to/for third parties 15. Each of these classes of information (11, 13, and 15 in FIG. 4) can be the same or different and can comprise, for example, all or part of the carrier fuel purchase information compiled by the Network Administrator.

As noted previously, the fuel purchase information 18 from each carrier purchase is transmitted to the Network Administrator. Preferably the transmission happens in real-time (or near real-time) and originates from the location where the fuel was purchased. Typical fuel purchase information generally includes the amount of fuel purchased, the grade or type of fuel purchased, the cost paid per unit of fuel, the date and time the fuel was purchased, and the location where the fuel was purchased. The more timely the carrier fuel purchase information is transmitted to the Network Administrator, the more accurately the database 50 reflects the current fuel market and the financial position of both carriers and shippers with respect to their fuel costs.

The Fuel Information System:

The Fuel-for-Freight Network requires a Network Administrator to compile the data associated with each fuel purchase made by the carrier while transporting a shipment. Preferably, this is done by the Network Administrator using a set of protocols designated herein as the Fuel Information System. The Fuel Information System enables the carrier to initiate the fuel purchase and authorizes the fuel seller to deliver the fuel and consummate the sale. The Fuel Information System likewise tabulates the actual fuel prices charged to the carriers, and computes the costs owed by the shipper. The Fuel Information System also provides the capability for auditing the Fuel-for-Freight Network transactions. In the preferred embodiment, access to the Fuel Information System is provided equally to all shippers and carriers participating in Fuel-for-Freight program. In essence, the Fuel Information System enables shippers to implement and manage all aspects of their fuel program.

At the heart of the Fuel Information System is a computer-implemented program that manages and calculates all fuel pricing and costs for both shippers and carriers, as well as fuel providers and transaction card providers (e.g., credit, debit, and check card companies). Pricing, quantities, and locations are provided on an equal basis to all participants that are party to the fuel purchase. This visibility and equal access enables all parties—shippers, carriers, fuel providers and transaction card providers alike—to implement, manage and control the fuel transaction.

The Fuel Information System also handles all financial aspects of transactions consummated in the Fuel-for-Freight Network, including fuel pricing, freight-fuel matching, carrier fuel credit management, and shipper fuel invoicing. The Fuel Information System also provides comprehensive management reporting to understand, manage and audit fuel transactions and costs.

There are four major components of the Fuel Information System:

The Electronic Communication Module (ECM). The ECM provides the electronic communication interface, through EDI or XML transactions (or any other communication protocol), between participants in the Fuel-for-Freight Network and its trading partners. These transactions include shipper load tenders, carrier fuelings, fuel provider cost and price information, and transaction provider data sets.

The Fuel Transaction Engine. The transaction engine manages and controls all fuel transactions, captures and applies all cost and price information, captures and matches all freight and fuel transactions, and controls all settlements for both shippers and carriers.

The Shipper Web Interface. Shippers will have access to the Financial Information System through a secure shipper web interface. The Shipper Web Interface thus provides shippers with the key functionality to manage their individual fuel program, including the ability: to access to all freight and fuel transactions; to control and manage all transactions, to access and to authorization all settlements, to generate comprehensive management and audit reports.

The Carrier Web Interface. Likewise, carriers will have access to the Financial Information System through a secure carrier web interface that provides carriers with key operational, transactional, and reporting capabilities. The operational capabilities include Network locations, fuel price by location, and carrier fuel credit (eligible fuel unit) balances. The transaction capabilities include the ability to access fuel and freight transactions as well as settlements. Additional capabilities include comprehensive management reporting and audit capabilities.

In addition, the Fuel Information System will provide information valuable to shippers to manage carriers excluded from the Fuel-for-Freight Network or carriers that remain on a fuel surcharge program. In short, the Network give shippers the ability to compare overall movement costs for shipments made in the Network to shipments made outside of the Network. These data ultimately provide the shipper with a more accurate picture of the true cost of fuel, and thus arms shippers with the data need to manage this critical cost dynamically, aggressively, and proactively.

Strategic Fuel Programs:

The third component of the present invention is the Strategic Fuel Program. Simply put, once a shipper takes control of its fuel-related programs, the shipper has the opportunity to develop a long-term fuel strategy.

Shippers transacting their fuel purchases through the Fuel-for-Freight Network have the ability to develop long-term fuel strategies to help reduce financial volatility and to manage fuel supply. Custom programs are developed in alignment with the shipper's corporate culture and fuel requirements.

Consultants from the Network Administrator will work with shippers to understand, implement and manage their fuel long-term fuel programs. The Strategic Fuel Program can range from essentially no strategic plan (that is, simply moving with the fuel market—acquiring fuel at the market price at the time the fuel is need to move a particular shipment—to full price protection with futures programs and a range of programs in-between that can moderate or cap costs and/or moderate price volatility. These long-term programs can help manage and stabilize a shipper's cost of transporting its goods from origin to destination.

A unique aspect of the strategic fuel program is its capacity to be integrated within the Fuel-for-Freight Network itself. Specifically, once a shipper takes control and manages its fuels costs (rather than being at the whim of a fuel surcharge schedule), shippers can develop and implement a strategic fuel program to influence and control the long-term price volatility of fuel. These strategic programs—for example price hedges, caps, collars, etc—can be integrated into the Fuel Information System so that the benefit of the price hedging programs can be linked, in real-time, to individual freight transactions.

Advantages of the Present Invention:

There are several benefits for shippers that can lower the cost of moving their products to market by controlling fuel costs:

For example, the cost of incremental fuel prices (i.e., the threshold points where standard fuel surcharges begin) can be managed and leveraged to reduce actual fuel costs. Instead of basing this fuel cost on a national fuel average that is based on the retail pump price, shippers' "index" will be a true cost based on the buying leverage of both the individual shipper and the entire Fuel-for-Freight Network. As the Network grows, the cost difference between the retail average at-the-pump cost of fuel and actual cost paid by shippers and carriers within the Fuel-for-Freight Network will continue to spread.

Freight costs actually paid will reflect the true cost of getting product to market, without having the volatility of fuel costs being improperly factored into the cost. Thus, the present invention provides shippers an opportunity to negotiate with carriers on an apples-to-apples basis and to analyze trends associated with the true costs of serving any given market area.

Shippers have the potential to make money on fuel purchases. For all but the largest carriers, the Fuel-for-Freight Network may be a lower-cost alternative even with an optional small margin built in by the shipper. In short, the volume of fuel purchases created by the Network functions to lower fuel costs for all players (rather then artificially inflate costs as in a fuel surcharge protocol indexed to the full retail price of fuel. The shipper can use this revenue to offset some of its fuel-related expenses to increase the gap between national retail fuel price averages and the fuel prices that can be had within the Fuel-for-Freight Network.

By taking control of fuel used to move freight, shippers can leverage their total fuel purchases and reduce the price of all fuel being used to support their operations and facilities.

What is claimed is:

1. A computer-implemented method for managing fuel costs, comprising:
   receiving, compiling, and storing transaction information at a Network Administrator loaded on a computer, the transaction information being associated with:
   (a) a shipper who has arranged for a shipment of goods from an origin to a destination; and (b) a corresponding carrier that has agreed to transport the shipment using
      (i) a pre-determined maximum number of eligible units of fuel,
      (ii) the fuel purchased by the carrier at a pre-set base price per eligible unit, and
      (iii) the fuel purchased from pre-selected fueling locations selected by the shipper;
   wherein the maximum number of eligible units of fuel and the base price per eligible unit for the shipment are established by the shipper, the base price per eligible unit of fuel is fixed before the shipment is made, and the fueling locations are established by the Network Administrator; and
   transmitting to the computer on which the Network Administrator is loaded carrier fuel purchase information associated with fuel purchases made by the carrier at the pre-selected fueling locations.

2. The method of claim 1, wherein the carrier fuel purchase information comprises the number of units of fuel purchased by the carrier and a price per unit paid by the carrier for all units of fuel purchased.

3. The method of claim 2, wherein the carrier fuel purchase information further comprises one or more identifiers selected from the group consisting of a shipper identifier, a carrier identifier, a shipment identifier, an origin identifier, a destination identifier, a route identifier, a sender identifier, a recipient identifier, a date identifier, a time identifier, a location identifier, a fuel merchant identifier, a driver identifier, a vehicle identifier, a vehicle miles-per-gallon identifier, a vehicle odometer identifier, and a vehicle weight identifier.

4. The method of claim 1, further comprising transmitting carrier fuel purchase information from the computer on which the Network Administrator is loaded to the shipper and the carrier.

5. The method of claim 4, wherein the carrier fuel purchase information transmitted to the shipper reflects any difference in price between the base price per eligible unit of fuel and actual price per eligible unit paid by the carrier; and wherein the carrier fuel purchase information transmitted to the carrier reflects a number of ineligible units of fuel purchased by the carrier and actual price per ineligible unit paid by the carrier.

6. The method of claim 4, wherein the carrier fuel purchase information further comprises one or more identifiers selected from the group consisting of a shipper identifier, a carrier identifier, a shipment identifier, an origin identifier, a destination identifier, a route identifier, a sender identifier, a recipient identifier, a date identifier, a time identifier, a location identifier, a fuel merchant identifier, a driver identifier, a vehicle identifier, a vehicle miles-per-gallon identifier, a vehicle odometer identifier, and a vehicle weight identifier.

7. The method of claim 1, wherein the transaction information comprises one or more identifiers selected from the group consisting of a maximum-number-of-eligible-units-of-fuel identifier, a base-price-per-eligible-unit identifier, and a fueling locations identifier.

8. The method of claim 7, wherein the transaction information further comprises one or more identifiers selected from the group consisting of a shipper identifier, a carrier identifier, a shipment identifier, a pick-up date identifier, a delivery-date identifier, an origin identifier, a destination identifier, a route identifier, a sender identifier, a recipient identifier, a date identifier, a time identifier, a location identifier, a fuel merchant identifier, a driver identifier, a vehicle identifier, a vehicle miles-per-gallon identifier, a vehicle odometer identifier, and a vehicle weight identifier.

9. The method of claim 7, further comprising transmitting carrier fuel purchase information from the computer on which the Network Administrator is loaded to the shipper and the carrier.

10. The method of claim 9, wherein the carrier fuel purchase information transmitted to the shipper reflects any difference in price between the base price per eligible unit of fuel and actual price per eligible unit paid by the carrier; and wherein the carrier fuel purchase information transmitted to the carrier reflects a number of ineligible units of fuel purchased by the carrier and actual price per ineligible unit paid by the carrier.

11. The method of claim 1, wherein the carrier fuel purchase information comprises one or more identifiers selected from the group consisting of a number-of-eligible-units-purchased identifier, an eligible-units-remaining identifier, and a number-of-ineligible-units-purchased identifier.

12. The method of claim 1, further comprising transmitting the carrier fuel purchase information to a third party.

13. The method of claim 12, wherein the third party is a credit card, debit card, or check card processor.

14. The method of claim 1, further comprising compiling the carrier fuel purchase information transmitted to the Network Administrator into a computer-implemented database.

15. The method of claim 14, wherein the computer implemented database is accessible by third parties.

16. A computer-implemented method for managing fuel costs, comprising:
   receiving, compiling, and storing transaction information at a Network Administrator loaded on a computer, the transaction information being associated with: (a) a shipper who has arranged for a shipment of goods from an origin to a destination; and (b) a corresponding carrier that has agreed to transport the shipment using
   (i) a pre-determined maximum number of eligible units of fuel,
   (ii) the fuel purchased by the carrier at a pre-set base price per eligible unit, and
   (iii) the fuel purchased from pre-selected fueling locations selected by the shipper;
   wherein the maximum number of eligible units of fuel and the base price per eligible unit for the shipment are established by the shipper, the base price per eligible unit of fuel is fixed before the shipment is made, and the fueling locations are established by the Network Administrator; and
   transmitting to the computer on which the Network Administrator is loaded carrier fuel purchase information associated with fuel purchases made by the carrier at the pre-selected fueling locations, wherein the carrier fuel purchase information comprises the number of units of fuel purchased by the carrier and a price per unit paid by the carrier for all units of fuel purchased.

17. The method of claim 16, further comprising transmitting carrier fuel purchase information from the computer on which the Network Administrator is loaded to the shipper and the carrier.

18. The method of claim 17, wherein the carrier fuel purchase information transmitted to the shipper reflects any difference in price between the base price per eligible unit of fuel and actual price per eligible unit paid by the carrier; and wherein the carrier fuel purchase information transmitted to the carrier reflects a number of ineligible units of fuel purchased by the carrier and actual price per ineligible unit paid by the carrier.

19. An apparatus comprising:
   a processor; and
   a storage device coupled to the processor and storing instructions adapted to be executed by the processor to:
   receive transaction information, the transaction information being associated with: (a) a shipper who has arranged for a shipment of goods from an origin to a destination; and (b) a corresponding carrier that has agreed to transport the shipment using
   (i) a pre-determined maximum number of eligible units of fuel,
   (ii) the fuel purchased by the carrier at a pre-set base price per eligible unit, and
   (iii) the fuel purchased from pre-selected fueling locations selected by the shipper;
   wherein the maximum number of eligible units of fuel and the base price per eligible unit for the shipment are established by the shipper, the base price per eligible unit of fuel is fixed before the shipment is made, and the fueling locations are established by a Network Administrator; and
   transmit to a Network Administrator carrier fuel purchase information associated with fuel purchases made by the carrier at the pre-selected fueling locations.

20. A computer-executable program tangibly embodied on a non-transitory computer-readable medium and adapted to be executed by a processor to perform a method for managing fuel costs, the method comprising:
   receiving transaction information at a Network Administrator, the transaction information being associated with: (a) a shipper who has arranged for a shipment of goods from an origin to a destination; and (b) a corresponding carrier that has agreed to transport the shipment using
   (i) a pre-determined maximum number of eligible units of fuel,
   (ii) the fuel purchased by the carrier at a pre-set base price per eligible unit, and
   (iii) the fuel purchased from pre-selected fueling locations selected by the shipper;
   wherein the maximum number of eligible units of fuel and the base price per eligible unit for the shipment are established by the shipper, the base price per eligible unit of fuel is fixed before the shipment is made, and the fueling locations are established by the Network Administrator; and
   transmitting to the Network Administrator carrier fuel purchase information associated with fuel purchases made by the carrier at the pre-selected fueling locations.

* * * * *